(12) United States Patent
Pu et al.

(10) Patent No.: US 12,236,664 B2
(45) Date of Patent: Feb. 25, 2025

(54) PROCESSING PICTURE-TEXT DATA (71) Applicant: Alibaba (China) Co., Ltd., Hangzhou (CN)

(72) Inventors: Liming Pu, Hangzhou (CN); Zhongzhou Zhao, Hangzhou (CN); Shuiling He, Hangzhou (CN); Xuming Lin, Hangzhou (CN); Ji Zhang, Hangzhou (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 299 days.

(21) Appl. No.: 17/692,869

(22) Filed: Mar. 11, 2022

(65) Prior Publication Data
US 2022/0301285 A1 Sep. 22, 2022

(30) Foreign Application Priority Data
Mar. 19, 2021 (CN) .......................... 202110298383.5

(51) Int. Cl.
| | |
|---|---|
| *G06V 10/74* | (2022.01) |
| *G06T 7/10* | (2017.01) |
| *G06T 11/60* | (2006.01) |
| *G06V 10/40* | (2022.01) |
| *G06V 10/764* | (2022.01) |
| *G06V 20/62* | (2022.01) |
| *G06V 20/70* | (2022.01) |

(52) U.S. Cl.
CPC .............. *G06V 10/761* (2022.01); *G06T 7/10* (2017.01); *G06T 11/60* (2013.01); *G06V 10/40* (2022.01); *G06V 10/764* (2022.01); *G06V 20/62* (2022.01); *G06V 20/70* (2022.01); *G06T 2207/20021* (2013.01); *G06V 2201/07* (2022.01)

(58) Field of Classification Search
CPC .... G06V 10/761; G06V 10/40; G06V 10/764; G06V 20/62; G06V 20/70; G06V 2201/07; G06V 2201/10; G06V 20/60; G06T 7/10; G06T 11/60; G06T 2207/20021; G06F 16/583; G06F 16/55; G06F 16/90332
USPC ......................................................... 382/103
See application file for complete search history.

(56) References Cited

U.S. PATENT DOCUMENTS

| | | | | |
|---|---|---|---|---|
| 6,507,415 | B1 * | 1/2003 | Toyoda ................ | H04N 1/3876 |
| | | | | 382/284 |
| 6,763,148 | B1 * | 7/2004 | Sternberg ............... | G06V 20/00 |
| | | | | 707/E17.02 |
| 8,600,989 | B2 * | 12/2013 | Hull ..................... | G06V 30/414 |
| | | | | 707/758 |

(Continued)

*Primary Examiner* — Negussie Worku
(74) *Attorney, Agent, or Firm* — Lee & Hayes, P.C.

(57) ABSTRACT

A method is used to automatically generate a picture-text description file containing text(s) and picture(s), including: acquiring a text material related to a target object; acquiring, according to information of the target object, a plurality of picture materials related to the target object; extracting first feature information of the picture materials and second feature information of the text material; determining, according to the first feature information and the second feature information, one or more picture materials that are matched with the text material; and combining the text material with one or more matching picture materials to generate the picture-text description file of the target object. The method improves matching between texts and the corresponding pictures.

20 Claims, 5 Drawing Sheets

(56) References Cited

U.S. PATENT DOCUMENTS

| | | | | |
|---|---|---|---|---|
| 8,744,173 | B2* | 6/2014 | Vincent | G06T 3/4053 |
| | | | | 382/101 |
| 2002/0097436 | A1* | 7/2002 | Yokoyama | H04N 1/644 |
| | | | | 358/1.9 |
| 2005/0278624 | A1* | 12/2005 | Nishikawa | G06T 11/60 |
| | | | | 715/236 |
| 2006/0259462 | A1* | 11/2006 | Timmons | G06F 16/90335 |
| | | | | 707/E17.14 |
| 2008/0002914 | A1* | 1/2008 | Vincent | G06V 30/164 |
| | | | | 382/187 |
| 2013/0039570 | A1* | 2/2013 | Vincent | G06T 11/60 |
| | | | | 382/159 |
| 2014/0212040 | A1* | 7/2014 | Walker | G06V 30/1456 |
| | | | | 382/182 |
| 2022/0301285 | A1* | 9/2022 | Pu | G06V 20/62 |

* cited by examiner

PROCESSING PICTURE-TEXT DATA

CROSS REFERENCE TO RELATED APPLICATIONS

This application claims priority to Chinese patent application No. 202110298383.5 filed on 19 Mar. 2021 and entitled "METHOD, APPARATUS, ELECTRONIC DEVICE, AND COMPUTER STORAGE MEDIUM FOR PROCESSING PICTURE-TEXT DATA," which is incorporated herein by reference in its entirety.

TECHNICAL FIELD

Embodiments of the present disclosure relate to the technical field of computer technology, and, more particularly, to method apparatuses, electronic devices, and computer storage media for processing picture-text data.

BACKGROUND

A picture-text description file is used to describe a target object in the form of text and pictures. Taking a virtual live broadcast scene as an example, a picture-text description file can be used as a live broadcast script when the live broadcast is performed through a virtual object (hereinafter referred to as a virtual anchor). In the conventional techniques, a picture-text description file containing text and pictures is usually created manually. The problem of this picture matching method is that manual matching of a picture for text is inefficient and labor-intensive, and the quality of picture matching depends on the ability of a worker for picture matching, which cannot guarantee the efficiency and quality of picture matching.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The embodiments of the present disclosure provide a solution for processing picture-text data to solve the above-mentioned problems.

According to an example embodiment of the present disclosure, a method for processing picture-text data is provided, which is used to automatically generate a picture-text description file containing text and a picture(s) and includes: acquiring a text material related to a target object; acquiring, according to information of the target object, a plurality of picture materials related to the target object; extracting first feature information of the picture materials and second feature information of the text material; determining, according to the first feature information and the second feature information, one or more picture materials that are matched with the text material; and combining the text material with one or more matching picture materials to generate the picture-text description file of the target object.

According to an example embodiment of the present disclosure, an apparatus for processing picture-text data is provided, which is used to automatically generate a picture-text description file containing text and a picture(s) and includes: a first acquisition module used to acquire a text material related to a target object; a second acquisition module used to acquire, according to information of the target object, a plurality of picture materials related to the target object; an extraction module used to extract first feature information of the picture materials and second feature information of the text material; a determination module used to determine, according to the first feature information and the second feature information, one or more picture materials that are matched with the text material; and a combination module used to combine the text material with one or more matching picture materials to generate the picture-text description file of the target object.

According to an example embodiment of the present disclosure, an electronic device is provided, including: a processor, a memory, a communication interface, and a communication bus. The processor, the memory, and the communication interface communicate with each other through the communication bus. The memory is used to store at least one executable instruction that causes the processor to perform operations corresponding to the above method for processing picture-text data.

According to an example embodiment of the present disclosure, a computer storage medium is provided, which stores a computer program, wherein the program, when executed by a processor, implements the above method for processing picture-text data.

According to the solution for processing picture-text data provided by the embodiments of the present disclosure, by extracting the second feature information of the text material and the first feature information of the picture materials of the target object, and selecting, according to the first feature information and the second feature information, the matching picture materials for the text material, the semantic similarity between the matching picture materials and the text material is high, the text material and picture materials in the picture-text description file generated on the basis of the text material and the matching picture materials have good relevance, and the picture-text description file has a better usage effect. Furthermore, the disclosed method for automatically generating a picture-text description file has low cost, high efficiency, and low labor intensity.

BRIEF DESCRIPTION OF DRAWINGS

In order to describe the technical solutions more clearly in the embodiments of the present disclosure, the following will briefly introduce the drawings that need to be used in the description of the embodiments. Apparently, the drawings in the following description are only some instead of all of the embodiments described in the embodiments of the present disclosure. For those of ordinary skill in the art, other drawings may also be acquired on the basis of these drawings.

DETAILED DESCRIPTION

In order to enable those skilled in the art to better understand the technical solutions in the embodiments of the present disclosure, the technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in the embodiments of the present disclosure, all other embodiments acquired by those of ordinary skill in the art should fall within the protection scope of the embodiments of the present disclosure.

The specific implementation of the embodiments of the present disclosure will be further described below in conjunction with the accompanying drawings of the embodiments of the present disclosure.

Figure 1A:
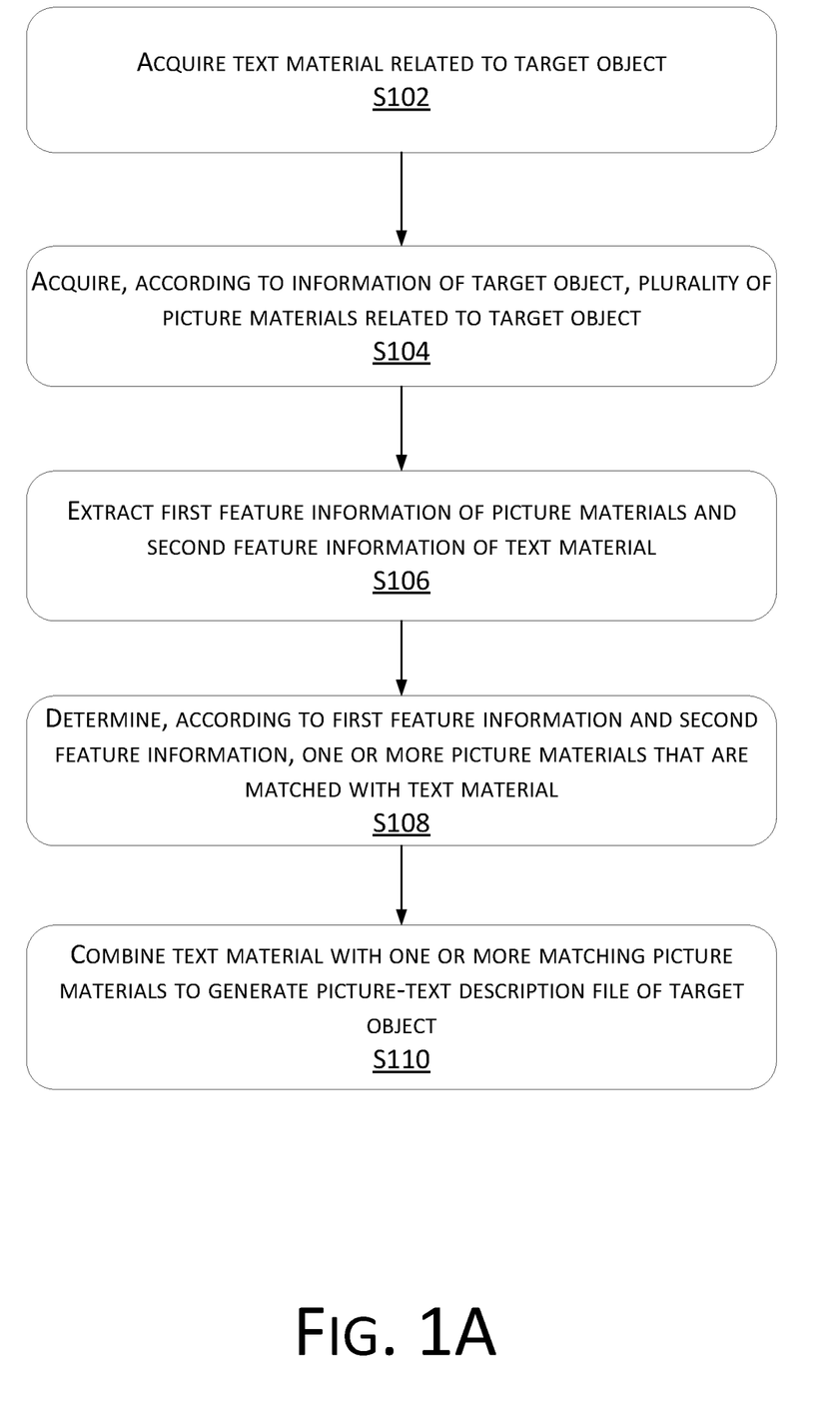
FIG. 1A is a flow chart of a method for processing picture-text data according to an example embodiment of the present disclosure.

Referring to FIG. 1A, a flow chart of a method for processing picture-text data of an example embodiment of the present disclosure is illustrated.

In this embodiment, the method includes the following steps.

At step S102: a text material related to a target object is acquired.

The target object may be a commodity, a building, or any other object that needs to be described by a picture-text description file.

The text material may be explanatory text used to describe the target object, for example, a text script used in a virtual live broadcast scene. The text material may be structured text in an XML format or other formats, or a plain text script. The structured text means that at least some of sentences or paragraphs therein have corresponding tags.

At step S104: a plurality of picture materials related to the target object are acquired according to information of the target object.

The information of the target object may be the name or category name of the target object. The picture materials may be acquired from the detail page, user guide, or other materials of the target object.

At step S106: first feature information of the picture materials and second feature information of the text material are extracted.

The first feature information is used to describe the picture materials. For example, if the picture materials are pictures related to clothes, the first feature information may be "full-length view of a model," "half-length view of a model," "collar details," "texture details," or the like.

The first feature information may be acquired by using a machine learning model to perform feature extraction on the picture materials or to recognize text in the picture materials.

The second feature information is used to describe features of at least part of sentences in the text material. For example, if the text material is a description of clothes, the second feature information may be "collar type: V-neck" and "texture: polyester."

If the text material is a structured script, tags may be parsed from it, and the second feature information may be determined according to the tags. Or, if the text material is a plain text script, the second feature information may be acquired by performing feature extraction through a trained machine learning model for feature extraction (such as a LSTM model and a transformer model).

At step S108: one or more picture materials that are matched with the text material are determined according to the first feature information and the second feature information.

For example, an attribute indicated by the second feature information is matched with the first feature information, so as to determine the picture materials that are matched with the text material.

For example, if the second feature information of the sentence in the text material is "collar type: V-neck," picture materials with the first feature information being "detail view" or "collar detail view" are selected as candidate picture materials from the plurality of picture materials.

Alternatively, in order to further improve the accuracy of the picture materials that are matched with the text material, a question vector may be constructed for the second feature information of the sentence (such as "collar type: V-neck"), and answer vectors may be constructed on the basis of the candidate picture materials; matching is performed on the question vector and the plurality of answer vectors; and picture materials corresponding to the appropriate answer vectors are selected as the matching picture materials. In this way, the sentence in the text material may be matched with pictures, so that the picture matching granularity is finer, and the effect is better.

At step S110: the text material is combined with one or more matching picture materials to generate a picture-text description file of the target object.

For example, one or more picture materials are selected from the matching picture materials and are added to the text material to form the picture-text description file.

Through this method, matching picture materials can be automatically selected for the text material according to the second feature information of the text material and the first feature information of the picture materials, so that the semantic meaning shown in the picture materials and the semantic meaning shown in the text material are matched, thus solving the problem that manual picture matching in the conventional techniques has high labor intensity, low speed, and unstable quality and ensuring that the picture materials and the text material are good in semantic fitness and pictures are accurately matched.

Figure 1B:
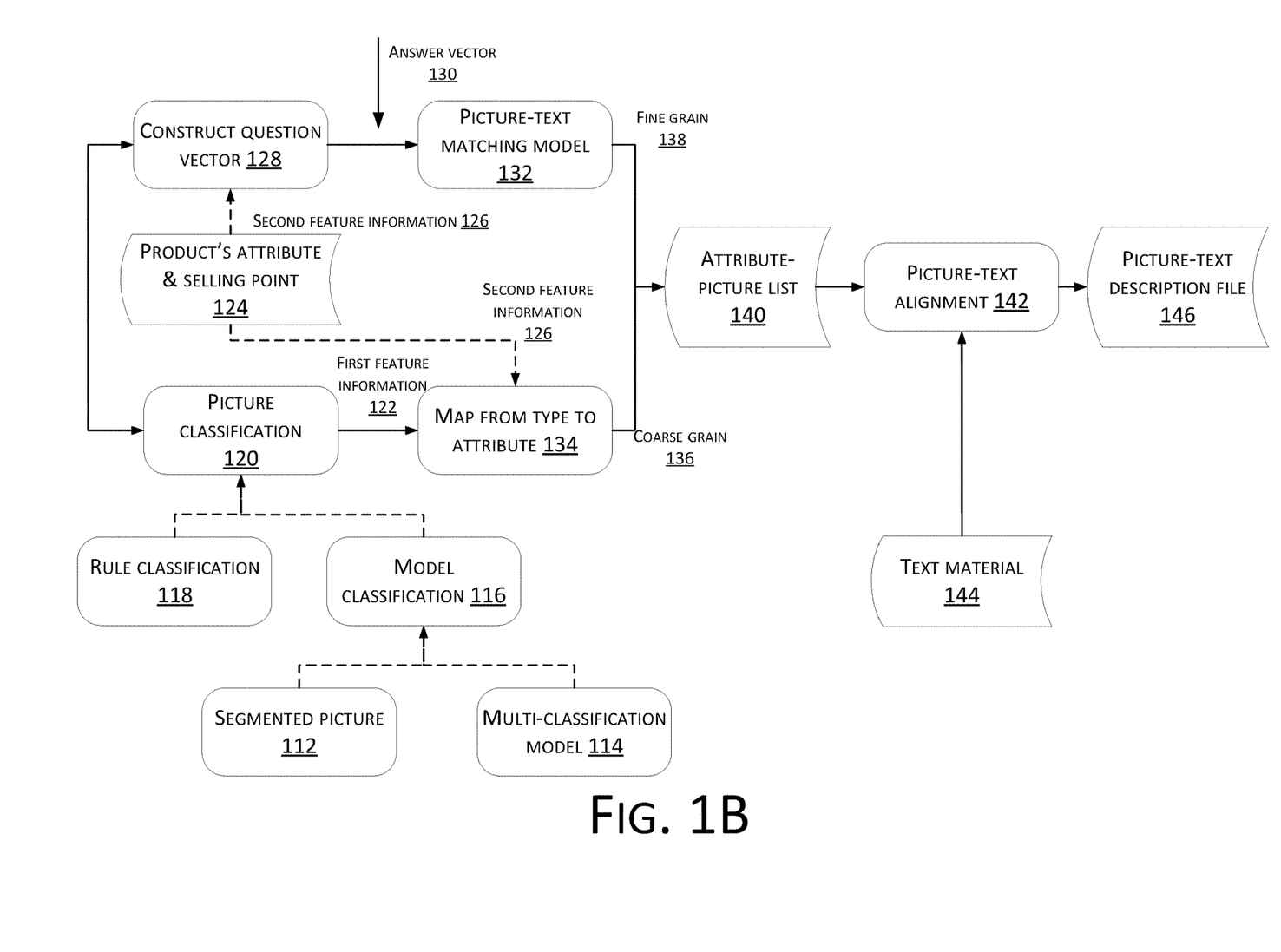
FIG. 1B is a schematic diagram of a scenario example in the embodiment shown in FIG. 1A.

With reference to FIG. 1B and by taking a specific usage scenario as an example, the implementation process of this method is described as follows.

For example, the original pictures are obtained. The segmented picture 112 is obtained from the original picture as the picture material. The original pictures may be segmented through a multi-classification model 114. Through the model classification 116 and the rule classification 118, the picture classification 120 of the picture material is predicted and the classification of the picture material is determined. The first feature information 122 is determined from the picture classification 120.

In addition, the product attribute & selling point 124 of the product corresponding to the picture material is obtained. The product attribute & selling point 124 may include features and highlights of the product. The second feature information 126 is determined from the product's attribute & selling point 124. The question vector 128 is constructed based on the second feature information 126. The answer vector 130 is constructed based on the picture material. The question vector 128 and the answer vector 130 are input into the picture-text matching model 132.

Based on the first feature information 122 and the second feature information 126, the map 134 from type of the pictures to the attributes of the products are conducted. The coarse grain 136 of the picture that matches the text is obtained through the mapping. The fine grain 138 of the picture that matches the text is trained and improved through the picture-text matching model 132.

The attribute-picture list 140 is obtained from the attributes and pictures determined from the map 134 and the picture-text matching model 132. Based on the attribute-picture list 140, the pictures and texts are aligned to obtain picture-text alignment 142. After the text material 144 is obtained, the corresponding pictures are obtained, and the picture and text form the picture-text description file 146.

A virtual live broadcast scenario is taken as an example. The picture-text description file generated by this method may be a script used by a virtual anchor. The virtual anchor introduces a product according to the content of the picture-text description file during the live broadcast.

For example, the target object is a clothing product. The text material related to the target object may be extracted from its user guide or may also be acquired in other ways, which is not limited in this scenario. The picture materials of the target object may be acquired from an introduction page, a detail page, etc. of this product.

For the picture materials, the first feature information may be acquired by means of extracting features of the picture materials and/or recognizing the text in the pictures. For example, the first feature information of picture material A is "front view of model-collar type details," the first feature information of picture material B is "collar type details," the first feature information of picture material C is "texture details," and the like.

For the text material, if it is a plain text script, the second feature information of at least part of sentences therein may be acquired by means of a semantic recognition model and/or a keyword extraction model; or if it is a structured script, the second feature information of at least part of sentences therein may be acquired by means of parsing tags. For example, the second feature information of sentence A "this V-neck is particularly beautiful" is "collar type: V-neck."

On the basis of the second feature information of the text material, picture materials whose first feature information is matched with the second feature information may be matched from the picture materials. For example, on the basis of the "collar type" in the second feature information, picture materials whose first feature information includes the "collar type details" are matched from the plurality of picture materials.

According to the matching picture materials, one or more of them may be selected and added to the text material, thereby generating a picture-text description file of the target object.

In this way, it is feasible to automatically generate a picture-text description file for a target object and to ensure that the content in the picture-text description file is highly relevant to the target object, and there is no need for manual picture matching, which reduces the cost. Broadcasting live through such picture-text description file can make the language expression of a virtual host and the displayed picture materials more relevant, more harmonious, and adaptable, thereby ensuring the live broadcast effect and improving the reality of the virtual host. In addition, it can also be used to generate publicity documents for sharing with users through communication channels or social platforms, or used to make teaching files and condense course knowledge points for teachers as teaching references or for students as learning guides.

With the embodiment, by means of extracting the second feature information of the text material and the first feature information of the picture materials of the target object, and selecting, according to the first feature information and the second feature information, the matching picture materials for the text material, the semantic similarity between the matching picture materials and the text material is high, the text material and picture materials in the picture-text description file generated on the basis of the text material and the matching picture materials have good relevance, and the picture-text description file has a better usage effect; and furthermore, this method for automatically generating a picture-text description file has low cost, high efficiency, and low labor intensity.

The method for processing picture-text data of this embodiment may be executed by any appropriate electronic device with data processing capability, including but not limited to a server, a mobile terminal (such as a mobile phone, a PAD, etc.), and a PC.

Figure 2:
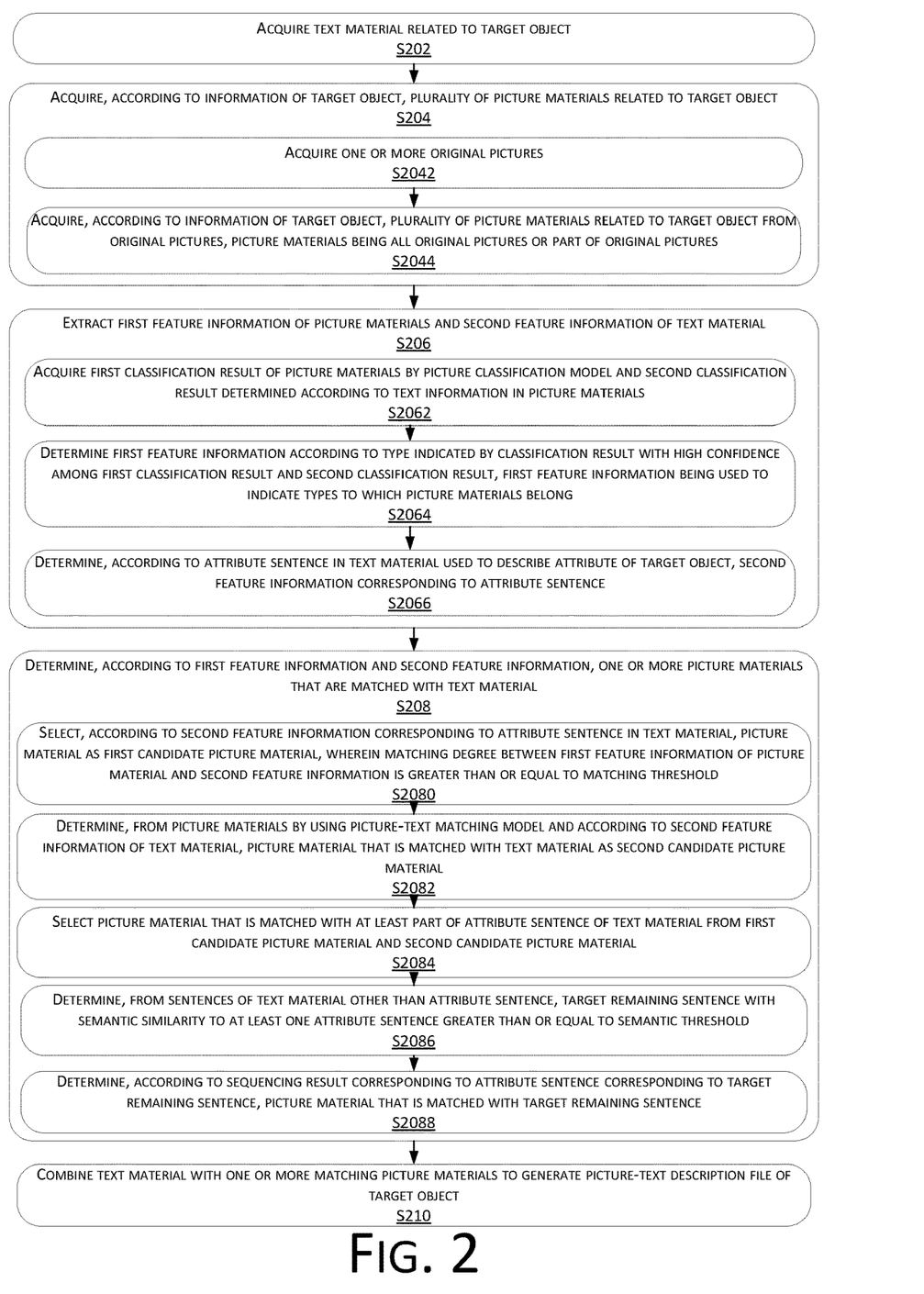
FIG. 2 is a flow chart of a method for processing picture-text data according to an example embodiment of the present disclosure.

Referring to FIG. 2, a flow chart of steps of a method for processing picture-text data of an example embodiment of the present disclosure is illustrated.

In this embodiment, the target object being a clothing product is taken as an example. The implementation process of the method is described as follows.

The method includes the following steps.

At step S202: a text material related to a target object is acquired.

The text material includes at least part of text in a text script and/or non-script text.

The text script may be a pre-written script and used to explain and introduce the target object. The text script may be applied to a virtual live broadcast scenario or other scenarios.

The text script may include sentences used to describe attributes of the target object, and may also include connection sentences for connecting different sentences and directive sentences for guiding the operation of a viewing object, etc., but it is not limited to this. The text material may be all sentences in the text script, or sentences used to explain the attributes of the target object, and it is not limited to this.

The non-script text may be a user guide, etc., and the text material may include at least part of the sentences in the user guide.

At step S204: a plurality of picture materials related to the target object are acquired according to information of the target object.

For example, step S204 includes the following sub-steps.

At sub-step S2042: one or more original pictures are acquired.

The original pictures may be acquired in any suitable way, such as extracting them from a user guide or extracting them from a detail page, a product display page, etc., which is not limited in this embodiment.

At sub-step S2402: a plurality of picture materials related to the target object are acquired from the original pictures according to information of the target object, the picture materials being all of the original pictures or part of the original pictures.

The information of the target object may be a name, a category name, or other appropriate information, which is not limited in this embodiment.

The picture materials may be one part cut out from the original pictures or may be all of the original pictures.

In one example, segmentation processing may be performed on original pictures that are too large in size, that is, sub-step S2044 may be implemented through the following processes.

Process A1: segmentation processing is performed on the original pictures with lengths greater than or equal to a length set value, and a plurality of segmented pictures are acquired.

The length set value may be determined according to needs. For example, the length set value is 1.5 times the length of the segmented picture. In this embodiment, the length refers to a length in a height direction of the picture.

By means of segmenting the original pictures, the original pictures that are too long can be segmented into segmented pictures with appropriate lengths to facilitate subsequent processing. It can be also ensured that semantic information in a single segmented picture is relatively simple, thereby improving the accuracy of the candidate first feature information and avoiding that a lengthy original picture exceeds a displayable range which affects the subsequent display effect.

For example, when the detail page of a product is used as an original picture, since the detail page of the product may be a long picture, which may contain parameters of the product, a front view of model, different detail views, etc., in order to facilitate the processing, the original picture may be segmented into a plurality of segmented pictures according to different semantic meanings.

For example, the parameters of the product, the front view of model, a texture detail view, and a collar detail view are respectively segmented into separate segmented pictures. In this way, the semantic meaning of each segmented picture is simpler and separate, so that the accuracy of the first feature information extracted subsequently is higher.

The segmentation processing of the original picture may be achieved by a machine learning model with a segmentation function, or may be achieved according to a set length.

Process B: text information of candidate pictures is acquired by taking the segmented pictures and/or the original pictures with lengths less than the length set value as the candidate pictures.

In order to better match the target object with the candidate pictures, the text information in the candidate pictures may be acquired by optical character recognition (OCR). For the candidate pictures without text, the recognized text may be empty.

In addition to recognizing the text information, a corresponding confidence may also be included, which is used to indicate the accuracy of the recognized text information. If the text information is recognized as being empty, its confidence is set to be "0" or other set values.

Process C1: a plurality of picture materials related to the target object are acquired from the candidate pictures according to the text information and the information of the target object.

For a candidate picture where text information is not empty, whether the candidate picture may be used as a picture material may be directly determined according to the text information. If the target object is clothing, the candidate pictures with the text information that includes "texture," "V-neck," and "front view of model" are selected as the picture materials.

For a candidate picture where the text information is empty, whether the candidate picture may be used as a picture material may be determined through a trained machine learning model. For example, the information of the target object and the candidate picture are input into the trained machine learning model, and whether the candidate picture is related to the target object is determined through the machine learning model. If yes, the candidate picture is used as a picture material.

At step S206: first feature information of the picture materials and second feature information of the text material are extracted.

For example, the extraction of the first feature information of the picture materials in step S206 is implemented through the following sub-steps S2062 to S2064. The extraction of the second feature information of the text material in step S206 may be implemented by the following sub-step S2066. It should be noted that there is no strict execution order among sub-step S2062 to sub-step S2066, and sub-step S2062 and sub-step S2066 may be executed in parallel.

Sub-step S2062: a first classification result of the picture materials by a picture classification model and a second classification result determined according to the text information in the picture materials are acquired.

The picture classification model is used to classify picture materials. The picture classification model may be a trained CNN model, RCNN model, or fast RCNN model.

Features in the candidate pictures may be detected through the picture classification model, and then the types and confidences of the picture materials are predicted according to the detected features and are used as the first classification result. The first classification result is, for example: {"front view of model," 90}, {"collar detail view," 95} or {"texture detail view," 86}, and the like. The confidence is used to indicate the accuracy of the prediction.

For picture materials with text information, the second classification result is acquired according to the semantic meaning and/or keywords of the text information during recognition of the text information. For example, if the text information contains "texture," "V-neck," "front view of model," etc., the second classification result is {"texture detail view," 90}, {"front view of model," 95}, etc.

Sub-step S2064: the first feature information is determined according to a type indicated by a classification result with a high confidence among the first classification result and the second classification result, the first feature information being used to indicate types to which the picture materials belong.

In a first case, if the confidence of the first classification result is high, the first feature information is determined according to the type indicated by the first classification result. If the type indicated by the first classification result is "texture detail view," it is determined that the first feature information is "texture detail map."

In a second case, if the confidence of the second classification result is high, the second feature information is determined according to the type indicated by the second classification result. If the type indicated by the second classification result is "front view of model," it is determined that the first feature information is "front view of model."

By means of extracting the text information of the picture materials, using the classification model to predict their types to acquire the first classification result, the second classification result, and the corresponding confidences, and determining the first feature information of the picture materials according to the confidences, the accuracy of the extraction of the first feature information of the picture materials is improved, and the problem in classification of the picture materials without text is solved, so that the first feature information of the picture materials can better reflect features of the picture materials and the semantic meaning of the content in the pictures.

Sub-step S2066: the second feature information corresponding to an attribute sentence in the text material used to describe an attribute of the target object is determined according to the attribute sentence.

Since the text material not only includes the attribute sentence used to describe the attribute of the target object, but also includes connection sentences, etc., and selections of pictures are usually for the attribute sentence, so as to better explain and display the target object through the pictures and the attribute sentence, the second feature information of the text material mainly includes the second feature information of the attribute sentence.

For example, if the attribute sentence is "this kind of V-neck is really beautiful," the second feature information corresponding to the attribute sentence may be determined as "collar type: V-neck" through semantic recognition. Collar type therein may be considered as an attribute, and V-neck may be considered as an attribute value.

For another example, for a structured text material, a tag may be acquired by parsing the tag of the attribute sentence, and the second feature information may be determined according to the tag. If the parsed tag is "collar type: V-neck," the second feature information may also be "collar type: V-neck."

At step S208: one or more picture materials that are matched with the text material are determined according to the first feature information and the second feature information.

In order to ensure the accuracy of the matching between the text material and the picture materials, and to enable the picture materials without text to be correctly matched with the text material, and to solve the problem in matching of the picture materials without text, step S208 includes the following sub-steps.

Step S2080: a picture material is selected as a first candidate picture material according to the second feature information corresponding to the attribute sentence in the text material, wherein a matching degree between first feature information of the picture material and the second feature information is greater than or equal to a matching threshold.

The matching threshold may be determined according to needs, which is not limited in this embodiment. For example, the matching threshold is 70%, 75%, 80%, or 90%.

The second feature information being "collar type: V-neck" is taken as an example. The first feature information having a matching degree with the second feature information greater than or equal to the matching threshold may be "collar type detail view," "front view of model," etc. that may possibly show the collar type. These picture materials may be used as the first candidate picture materials.

Step S2082: a picture-text matching model is used to determine, from the picture materials and according to the second feature information of the text material, a picture material that is matched with the text material as a second candidate picture material.

For example, step S2082 may be implemented through the following processes.

Process A2: a question vector is constructed according to the second feature information of the attribute sentence in the text material, and answer vectors are constructed according to the picture materials.

For example, the second feature information is "collar type: V-neck." A question sentence may be constructed on the basis of this, such as "Is the collar type V-neck." The question sentence may acquire the corresponding question vector through word embedding, or the question vector corresponding to the question sentence may be acquired in other ways.

For example, a color value of each pixel in the picture material is converted into the corresponding answer vector, or the answer vector is acquired in other appropriate ways.

Process B2: the question vector and each of the answer vectors are input into the picture-text matching model, and the second candidate picture material that is matched with the text material is determined according to a matching degree between the answer vector and the question vector which is output by the picture-text matching model.

The picture-text matching model, such as a visual question answering model, may process multi-modal information (such as text information and picture information) to determine the answer vector matched with the question vector from the plurality of picture materials, that is, to acquire the picture material matched with the second feature information.

The visual question answering model is used to achieve an effect that the matching second candidate picture materials can be acquired from the plurality of picture materials for attribute sentences in the form of text.

Step S2084: a picture material that is matched with at least part of the attribute sentence of the text material is selected from the first candidate picture material and the second candidate picture material.

For example, step S2084 is implemented through the following processes.

Process A3: the first candidate picture material and the second candidate picture material are ranked according to a matching degree between the first candidate picture material and the attribute sentence in the text material and a matching degree between the second candidate picture material and the attribute sentence in the text material.

Since there may be overlapping picture materials in the first candidate picture material and the second candidate picture material, the first candidate picture material and the second candidate picture material may be deduplicated and filtered.

The filtering processing is, for example, filtering out, according to a size, candidate picture materials that do not meet a size requirement. Candidate picture materials that are too long or too short, too wide, or too narrow or have an unsatisfactory aspect ratio (such as those other than 3:2, 2:3, 16:9, 16:10, etc.) are filtered out.

For another example, the selected candidate picture materials are filtered according to their quality. For example, candidate picture materials with too low or too high resolution are filtered out.

The deduplication processing is, for example, for the repeated first candidate picture material and second candidate picture material, a new matching degree is determined according to their own matching degrees, and one candidate picture material is removed. The new matching degree may be a higher matching degree, or may be obtained by weighting and summing two matching degrees.

This solves the problem that one picture material may be recalled as the first candidate picture material and the second candidate picture material at the same time and also solves the problem that duplicate picture materials may be recalled in different recall ways.

During ranking, the first candidate picture material and the second candidate picture material are merged and ranked according to the matching degrees from high to low.

Process B3: a picture material that is matched with the attribute sentence in the text material is determined according to a ranking result.

For example, Top N of the pictures are selected as the picture material matched with the attribute sentence according to the ranking result. Later, one or more of these matching picture materials may be selected as matching pictures of the attribute sentence.

Alternatively, step S208 includes the following sub-steps.

sub-step S2086: a target remaining sentence with a semantic similarity to at least one attribute sentence greater than or equal to a semantic threshold is determined from the sentences of the text material other than the attribute sentence.

The remaining sentences may be sentences for which no matching picture materials are found, and the sentences may be attribute sentences or non-attribute sentences. A similarity recognition model is used to identify similarities between the remaining sentences and the attribute sentence. If the semantic similarity between a remaining sentence and the attribute sentence is greater than or equal to the semantic threshold, the remaining sentence will be taken as the target remaining sentence.

The semantic threshold may be determined according to requirements, for example, 90%.

Sub-step S2088: a picture material that is matched with the target remaining sentence is determined according to the ranking result corresponding to the attribute sentence corresponding to the target remaining sentence.

For example, if attribute sentence B does not have a matching picture material, but the semantic similarity between attribute sentence B and attribute sentence A is high, one of the picture materials matched with attribute sentence A may be selected as a matching picture of attribute sentence B. This can realize picture matching for the remaining sentences.

At step 5210: the text material is combined with one or more matching picture materials to generate a picture-text description file of the target object.

For example, for one attribute sentence in the text material, at least one of the picture materials matching therewith may be selected as its matching picture.

For example, if the text material includes attribute sentence A, and there are 3 picture materials that are matched with attribute sentence A, one of the 3 picture materials may be randomly selected as a matching picture.

The text material and the attribute sentence are correspondingly combined to acquire the picture-text description file. In this way, sentence-level picture matching is realized, such that the picture matching granularity is finer, and the picture matching effect is better.

Certainly, in other embodiments, not only the text material and the picture material can be combined, but also the text material, the picture material, and an audio material can be combined to form a richer picture-text description file. The audio material may be at least one of voice or music.

Through the above method, picture materials can be recalled according to the attribute described in the sentence, and then automatic picture matching for a text material is realized, which solves the problems of high manual picture matching cost and difficult configuration. At the same time, sentence-level or even more fine-grained picture matching is also realized. The problem that there is only one picture for one text in the common way is avoided.

When the picture materials are acquired, the first feature information of the picture materials is mapped with the second feature information of the text material, which realizes the recall of picture materials without text, and solves the problem that it is easy to configure multi-text pictures and difficult to configure beautiful text-free pictures in the picture matching process according to the OCR content.

Through this method, a text material can be automatically matched with pictures, thereby generating a picture-text description file. Moreover, this method can automatically mine the picture materials from the detail page, a master picture, and a slave picture of the product, so as to carry out fine-grained picture matching for sentences a. The efficiency and accuracy of picture matching for sentences are both high. In addition, the method can quickly extend picture-text scripts of multiple industries, has higher industry generality, and can cope with complex requirements. The picture mining processes based on product attributes can be used to structuralize pictures, detail pages, etc. of products.

Figure 3:
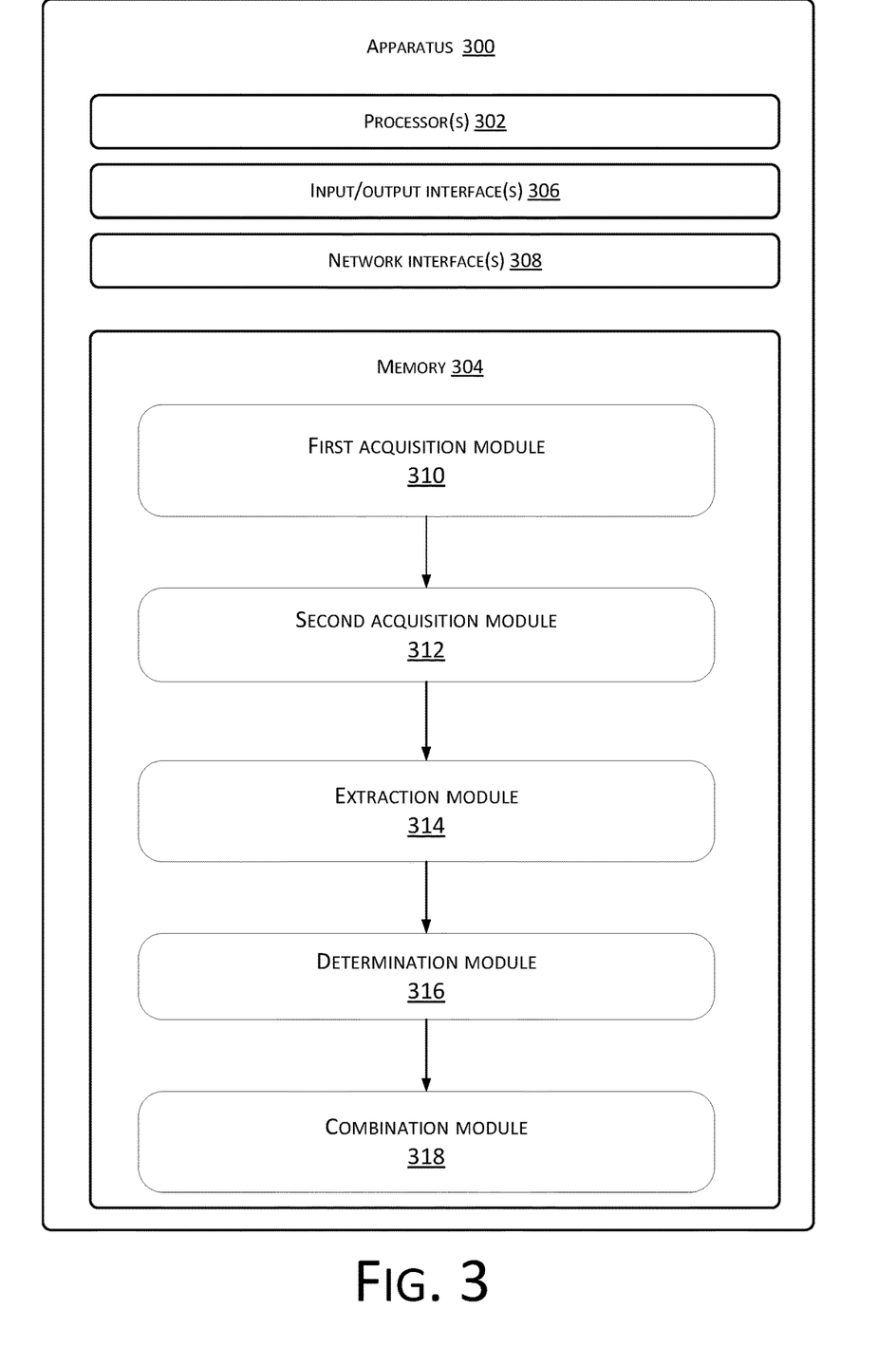
FIG. 3 is a structural block diagram of an apparatus for processing picture-text data according to an example embodiment of the present disclosure.

Referring to FIG.3, a structural block diagram of an apparatus for processing picture-text data of an example embodiment of the present disclosure is illustrated.

As shown in FIG. 3, the apparatus 300 includes one or more processor(s) 302 or data processing unit(s) and memory 304. The apparatus 300 may further include one or more input/output interface(s) 306 and one or more network interface(s) 308.

The memory 304 is an example of computer readable media. The computer readable media include non-volatile and volatile media as well as movable and non-movable media and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media or transitory media such as a modulated data signal and carrier.

The memory 304 may store therein a plurality of modules or units including:
- a first acquisition module 310 used to acquire a text material related to a target object;
- a second acquisition module 312 used to acquire, according to information of the target object, a plurality of picture materials related to the target object;
- an extraction module 314 used to extract first feature information of the picture materials and second feature information of the text material;
- a determination module 316 used to determine, according to the first feature information and the second feature information, one or more picture materials that are matched with the text material; and
- a combination module 318 used to combine the text material with one or more matching picture materials to generate the picture-text description file of the target object.

Alternatively, the second acquisition module 312 is used to acquire one or more original pictures and acquire, according to information of the target object, a plurality of picture materials related to the target object from the original pictures, the picture materials being all of the original pictures or part of the original pictures.

Alternatively, when acquiring the plurality of picture materials related to the target object from the original pictures according to the information of the target object, the second acquisition module 312 is used to perform segmentation processing on the original pictures with lengths greater than or equal to a length set value and acquire a plurality of segmented pictures; acquire text information of the candidate pictures by taking the segmented pictures and/or the original pictures with the lengths less than the length set value as candidate pictures; and acquire, according to the text information and the information of the target object, the plurality of picture materials related to the target object from the candidate pictures.

Alternatively, when extracting the first feature information of the picture materials, the extraction module 314 is used to acquire a first classification result of the picture materials by a picture classification model and a second classification result determined according to the text information in the picture materials; and determine the first feature information according to a type indicated by a classification result with a high confidence among the first classification result and the second classification result, the first feature information being used to indicate types to which the picture materials belong.

Alternatively, when extracting the second feature information of the text material, the extraction module 314 is used to determine, according to an attribute sentence in the text material used to describe the attribute of the target object, the second feature information corresponding to the attribute sentence.

Alternatively, the determination module 316 is used to select, according to the second feature information corresponding to the attribute sentence in the text material, a picture material with a matching degree between the first feature information and the second feature information greater than or equal to a matching threshold as a first candidate picture material; use, according to the second feature information of the text material, a picture-text matching model to determine, from the picture materials, a picture material matched the text material as a second candidate picture material; and select a picture material that is matched with at least a part of the attribute sentence of the text material from the first candidate picture material and the second candidate picture material.

Alternatively, when using the picture-text matching model to determine, from the picture materials, a picture material matched with the text material as the second candidate picture material, the determination module 316 is used to construct a question vector according to the second feature information of the attribute sentence in the text material and construct answer vectors according to the picture materials; input the question vector and each of the answer vectors into the picture-text matching model; and determine, according to a matching degree between the answer vector and the question vector which is output by the picture-text matching model, the second candidate picture material matched with the text material.

Alternatively, when selecting a picture material matched with at least a part of the attribute sentence of the text material from the first candidate picture material and the second candidate picture material, the determination module 316 is used to rank the first candidate picture material and the second candidate picture material according to a matching degree between the first candidate picture material and the attribute sentence in the text material and a matching degree between the second candidate picture material and the attribute sentence in the text material; and determine, according to a ranking result, a picture material matched with the attribute sentence in the text material.

Alternatively, the determination module 316 is used to determine, from remaining sentences of the text material other than the attribute sentence, a target remaining sentence with a semantic similarity to at least one attribute sentence greater than or equal to a semantic threshold, and determine, according to the ranking result corresponding to the attribute sentence corresponding to the target remaining sentence, a picture material matched with the target remaining sentence.

Alternatively, the text material includes at least part of text in a text script and/or a non-script text.

The apparatus for processing the picture-text data of this embodiment is used to implement the corresponding methods for processing data in the foregoing multiple method embodiments, and has the beneficial effects of the corresponding method embodiments, which will not be repeated here. In addition, the functional realization of each module in the apparatus for processing the picture-text data of this embodiment can refer to the description of the corresponding parts in the foregoing method embodiments, and will not be repeated here.

Figure 4:
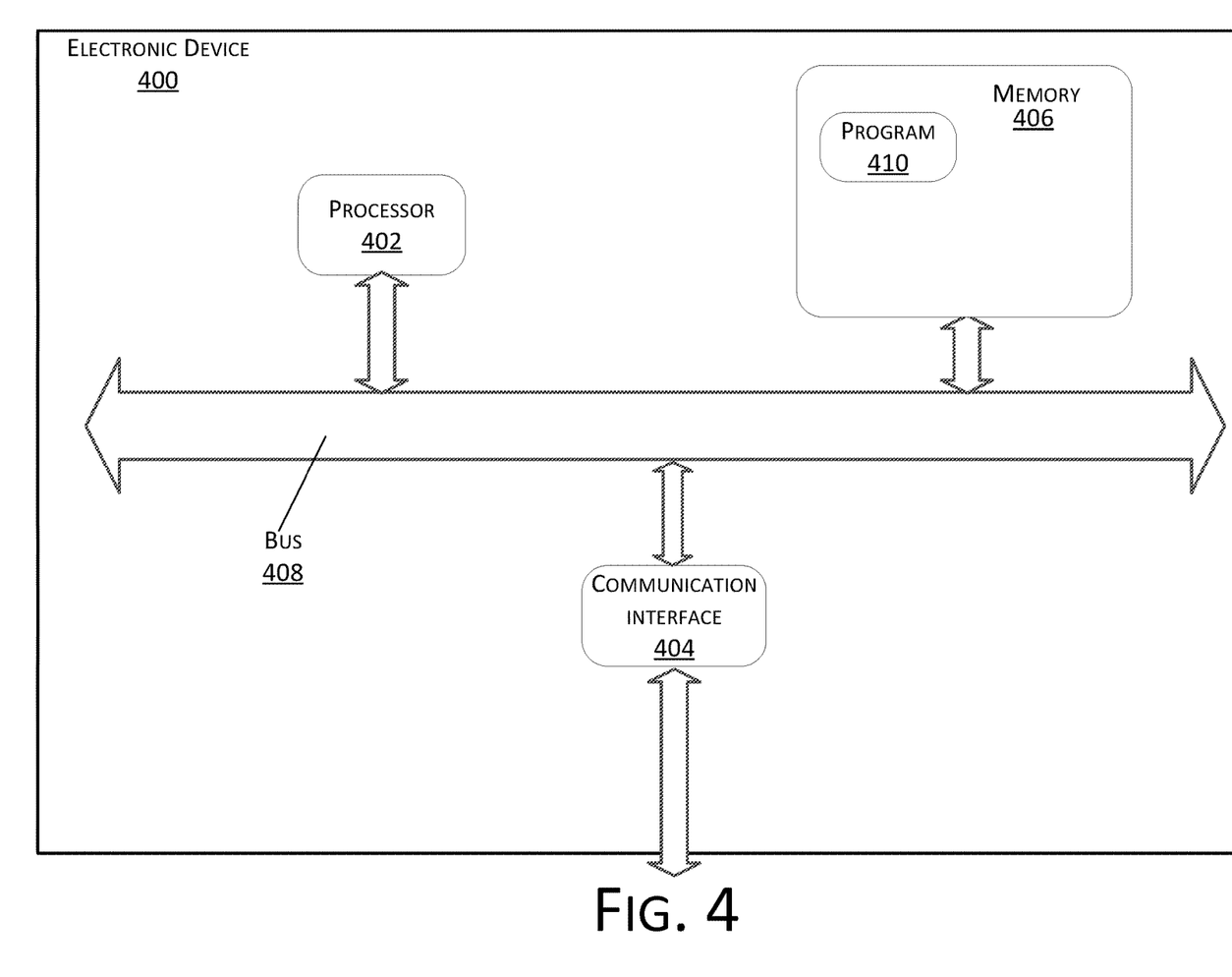
FIG. 4 is a schematic structural diagram of an electronic device according to an example embodiment of the present disclosure.

Referring to FIG. 4, a schematic structural diagram of an electronic device according to an example embodiment of the present disclosure is illustrated. The specific embodiment of the present disclosure does not limit the specific implementation of the electronic device.

As shown in FIG. 4, the electronic device 400 may include: processor 402, communication interface 404, memory 406, and communication bus 408.

The processor 402, communication interface 404, and memory 406 communicate with each other through communication bus 408.

Communication interface 404 is used to communicate with other electronic devices or servers.

Processor 402 is used to execute program 410, and specifically can execute relevant steps in the foregoing embodiment of the method for processing picture-text data.

Specifically, program 410 may include a program code, and the program code includes computer operation instructions.

Processor 402 may be a central processing unit (CPU), or an Application Specific Integrated Circuit (ASIC), or one or more integrated circuits configured to implement the embodiments of the present disclosure. The one or more processors included in the smart device may be the same type of processor, such as one or more CPUs, or different types of processors, such as one or more CPUs and one or more ASICs.

Memory 406 is used to store program 410. Memory 406 may include a high-speed RAM memory, and may also include a non-volatile memory, for example, at least one disk memory.

Program 410 may be specifically used to enable processor 402 to perform operations corresponding to the foregoing method for processing picture-text data.

For the specific implementation of each step in program 410, reference may be made to the corresponding descriptions in the corresponding steps and units in the foregoing embodiment of the method for processing picture-text data, which will not be repeated here. Those skilled in the art can clearly understand that, for the convenience and conciseness of the description, the specific working processes of the devices and modules described above can refer to the corresponding process descriptions in the foregoing method embodiments, which will not be repeated here.

It should be pointed out that, according to the needs of implementation, each component/step described in the embodiments of the present disclosure can be split into more components/steps, or two or more components/steps or partial operations of components/steps can be combined into new components/steps to achieve the purpose of the embodiments of the present disclosure.

The above-mentioned methods according to the embodiments of the present disclosure can be implemented in hardware, firmware, or implemented as software or computer codes that can be stored in a recording medium (such as a CD ROM, a RAM, a floppy disk, a hard disk, or a magneto-optical disk), or implemented as computer codes that are downloaded from a network and originally stored in a remote recording medium or a non-transitory machine-readable medium and will be stored in a local recording medium, so that the method described here can be processed by such software that is stored on a recording medium using a general-purpose computer, a dedicated processor or a programmable or special hardware (such as ASIC or FPGA). It can be understood that a computer, a processor, a microprocessor controller, or programmable hardware includes a storage component (for example, a RAM, a ROM, a flash memory, etc.) that can store or receive software or computer codes. The software or computer code, when accessed and executed by the computer, implements the method for processing picture-text data described here. In addition, when a general-purpose computer accesses a code for implementing the method for processing picture-text data shown here, the execution of the code converts the general-purpose computer into a dedicated computer for executing the method for processing picture-text data shown here.

Those of ordinary skill in the art may realize that the units and method steps of the examples described in combination with the embodiments disclosed herein can be implemented by electronic hardware or a combination of computer software and electronic hardware.90 Whether these functions are executed by hardware or software depends on the specific application and design constraint conditions of the technical solutions. Professionals and technicians can use different methods to implement the described functions for each specific application, but such implementation should not be considered as going beyond the scope of the embodiments of the present disclosure.

The above implementation modes are only used to illustrate the embodiments of the present disclosure, and are not intended to limit the embodiments of the present disclosure. those of ordinary skill in the relevant technical field can also make various changes and modifications without departing from the spirit and scope of the embodiments of the present disclosure. Therefore, all equivalent technical solutions also fall within the scope of the embodiments of this application, and the scope of patent protection of the embodiments of the present disclosure should be defined by the claims.

What is claimed is:

1. A method comprising:
   acquiring a text material related to a target object;
   acquiring, according to information of the target object, a plurality of picture materials related to the target object;
   extracting first feature information of the picture materials;
   extracting second feature information of the text material;
   determining, according to the first feature information and the second feature information, one or more picture materials from the plurality of picture materials that are matched with the text material; and
   combining the text material with the one or more matching picture materials to generate a picture-text description file of the target object.

2. The method according to claim 1, wherein the acquiring, according to the information of the target object, the plurality of picture materials related to the target object comprises:
   acquiring one or more original pictures; and
   acquiring, according to information of the target object, the plurality of picture materials related to the target object from the original pictures.

3. The method according to claim 2, wherein the plurality of picture materials is a part picture or a whole picture of the original pictures.

4. The method according to claim 2, wherein the acquiring, according to information of the target object, the plurality of picture materials related to the target object from the original pictures comprises:
   performing segmentation processing on the original pictures with a length greater than or equal to a length set value to obtain a plurality of segmented pictures;
   using the segmented pictures and/or original pictures with a length less than the length set value as candidate pictures;
   acquiring text information of the candidate pictures; and
   acquiring, according to the text information and the information of the target object, the plurality of picture materials related to the target object from the candidate pictures.

5. The method according to claim 1, wherein the extracting the first feature information of the picture materials comprises:
   acquiring a first classification result of the picture materials by a picture classification model and a second classification result determined according to text information in the picture materials; and
   determining the first feature information according to a type indicated by a classification result with a confidence higher than a threshold among the first classification result and the second classification result.

6. The method according to claim 5, wherein the first feature information indicates types to which the picture materials belong.

7. The method according to claim 1, wherein the extracting the second feature information of the text material comprises:
   determining, according to an attribute sentence in the text material used to describe an attribute of the target object, the second feature information corresponding to the attribute sentence.

8. The method according to claim 1, wherein the determining, according to the first feature information and the second feature information, the one or more picture materials that are matched with the text material comprises:
   selecting, according to second feature information corresponding to an attribute sentence in the text material, a picture material whose matching degree between first feature information of the picture material and the second feature information is greater than or equal to a matching threshold as a first candidate picture material;
   determining, from the picture materials, by using a picture-text matching model and according to the second feature information of the text material, another picture material that is matched with the text material as a second candidate picture material; and selecting a respective picture material that is matched with at least part of the attribute sentence of the text material from the first candidate picture material and the second candidate picture material.

9. The method according to claim 8, wherein the determining, from the picture materials, by using the picture-text matching model and according to the second feature information of the text material, the another picture material that is matched with the text material as the second candidate picture material comprises:
constructing a question vector according to the second feature information of the attribute sentence in the text material;
constructing one or more answer vectors according to the picture materials;
inputting the question vector and the one or more answer vectors into the picture-text matching model; and
determining, according to a matching degree between a respective answer vector and a respective question vector which is output by the picture-text matching model, the second candidate picture material that is matched with the text material.

10. The method according to claim 8, wherein the selecting the respective picture material that is matched with at least part of the attribute sentence of the text material from the first candidate picture material and the second candidate picture material comprises:
ranking the first candidate picture material and the second candidate picture material according to a matching degree between the first candidate picture material and the attribute sentence in the text material and a matching degree between the second candidate picture material and the attribute sentence in the text material; and
determining, according to a result of the ranking, the respective picture material that is matched with the attribute sentence in the text material.

11. The method according to claim 10, wherein the determining, according to the first feature information and the second feature information, one or more picture materials from the plurality of picture materials that are matched with the text material comprises:
determining, from sentences of the text material other than an attribute sentence, at least one target remaining sentence with a semantic similarity to the attribute sentence greater than or equal to a semantic threshold; and
determining, according to a ranking result of the attribute sentence corresponding to the at least one target remaining sentence, a respective picture material that is matched with the at least one target remaining sentence.

12. The method according to claim 1, wherein the text material comprises at least part of a text in a text script or a non-script text.

13. An apparatus comprising:
one or more processors; and
one or more memories storing thereon computer-readable instructions that, when executed by the one or more processors, cause the one or more processors to perform acts comprising:
acquiring a text material related to a target object;
acquiring, according to information of the target object, a plurality of picture materials related to the target object;
extracting first feature information of the picture materials;
extracting second feature information of the text material;
determining, according to the first feature information and the second feature information, one or more picture materials from the plurality of picture materials that are matched with the text material; and
combining the text material with the one or more matching picture materials to generate a picture-text description file of the target object.

14. The apparatus according to claim 13, wherein the acquiring, according to the information of the target object, the plurality of picture materials related to the target object comprises:
acquiring one or more original pictures; and
acquiring, according to information of the target object, the plurality of picture materials related to the target object from the original pictures.

15. The apparatus according to claim 14, wherein the acquiring, according to the information of the target object, the plurality of picture materials related to the target object from the original pictures comprises:
performing segmentation processing on the original pictures with a length greater than or equal to a length set value to obtain a plurality of segmented pictures;
using the segmented pictures and/or original pictures with a length less than the length set value as candidate pictures;
acquiring text information of the candidate pictures; and
acquiring, according to the text information and the information of the target object, the plurality of picture materials related to the target object from the candidate pictures.

16. The apparatus according to claim 13, wherein the extracting the first feature information of the picture materials comprises:
acquiring a first classification result of the picture materials by a picture classification model and a second classification result determined according to text information in the picture materials; and
determining the first feature information according to a type indicated by a classification result with a confidence higher than a threshold among the first classification result and the second classification result, the first feature information indicating types to which the picture materials belong.

17. The apparatus according to claim 13, wherein the extracting the second feature information of the text material comprises:
determining, according to an attribute sentence in the text material used to describe an attribute of the target object, the second feature information corresponding to the attribute sentence.

18. The apparatus according to claim 13, wherein the determining, according to the first feature information and the second feature information, the one or more picture materials that are matched with the text material comprises:
selecting, according to second feature information corresponding to an attribute sentence in the text material, a picture material whose matching degree between first feature information of the picture material and the second feature information is greater than or equal to a matching threshold as a first candidate picture material;
determining, from the picture materials, by using a picture-text matching model and according to the second feature information of the text material, another picture material that is matched with the text material as a second candidate picture material; and
selecting a respective picture material that is matched with at least part of the attribute sentence of the text material from the first candidate picture material and the second candidate picture material.

19. The apparatus according to claim 18, wherein the determining, from the picture materials, by using the picture-text matching model and according to the second feature information of the text material, the another picture material that is matched with the text material as the second candidate picture material comprises:
- constructing a question vector according to the second feature information of the attribute sentence in the text material;
- constructing one or more answer vectors according to the picture materials;
- inputting the question vector and the one or more answer vectors into the picture-text matching model; and
- determining, according to a matching degree between a respective answer vector and a respective question vector which is output by the picture-text matching model, the second candidate picture material that is matched with the text material.

20. One or more memories storing thereon computer-readable instructions that, when executed by one or more processors, cause the one or more processors to perform acts comprising:
- acquiring a text material related to a target object;
- acquiring, according to information of the target object, a plurality of picture materials related to the target object;
- extracting first feature information of the picture materials;
- extracting second feature information of the text material;
- determining, according to the first feature information and the second feature information, one or more picture materials from the plurality of picture materials that are matched with the text material; and
- combining the text material with the one or more matching picture materials to generate a picture-text description file of the target object.

* * * * *